(12) United States Patent
Joshi et al.

(10) Patent No.: US 9,053,305 B2
(45) Date of Patent: Jun. 9, 2015

(54) SYSTEM AND METHOD FOR GENERATING ONE-TIME PASSWORD FOR INFORMATION HANDLING RESOURCE

(71) Applicant: Dell Products L.P., Round Rock, TX (US)

(72) Inventors: Anand Joshi, Round Rock, TX (US); Ricardo L. Martinez, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 150 days.

(21) Appl. No.: 13/709,208

(22) Filed: Dec. 10, 2012

(65) Prior Publication Data

US 2014/0164781 A1    Jun. 12, 2014

(51) Int. Cl.
*G06F 21/00*    (2013.01)
*G06F 21/31*    (2013.01)

(52) U.S. Cl.
CPC ........ *G06F 21/31* (2013.01); *G06F 2221/2103* (2013.01); *G06F 2221/2107* (2013.01)

(58) Field of Classification Search
CPC ......... G06F 21/31; G06F 21/00; G06F 21/62; H04L 9/0894
USPC .............................. 713/184, 156, 168; 726/16
See application file for complete search history.

(56) References Cited

U.S. PATENT DOCUMENTS

| | | | | |
|---|---|---|---|---|
| 5,214,700 A | * | 5/1993 | Pinkas et al. | 713/156 |
| 2007/0050622 A1 | * | 3/2007 | Rager et al. | 713/168 |
| 2008/0301461 A1 | * | 12/2008 | Coulier et al. | 713/184 |
| 2009/0241182 A1 | * | 9/2009 | Jaber et al. | 726/16 |
| 2012/0311322 A1 | * | 12/2012 | Koyun et al. | 713/156 |

* cited by examiner

*Primary Examiner* — Syed Zaidi
(74) *Attorney, Agent, or Firm* — Jackson Walker L.L.P.

(57) ABSTRACT

In accordance with embodiments of the present disclosure, a method may include generating a random number to be associated with an information handling resource. The method may also include generating a challenge string based at least on the random number. The method may additionally include encrypting the challenge string using a first shared secret. The method may further include receiving a one-time password generated by a vendor associated with the information handling resource, the one-time password generated by decrypting the challenge string using the first shared secret, parsing the random number from the decrypted challenge string, and digitally signing the decrypted challenge string with a digital signature using a second shared secret. The method may also include granting user access to the information handling resource in response to verifying, using the second shared secret, that the digital signature matches the random number.

20 Claims, 2 Drawing Sheets

SYSTEM AND METHOD FOR GENERATING ONE-TIME PASSWORD FOR INFORMATION HANDLING RESOURCE

TECHNICAL FIELD

The present disclosure relates in general to information handling systems, and more particularly to generating a one-time password for an information handling resource of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A key component of almost every information handling system is the basic input/output system (BIOS). A BIOS may be a system, device, or apparatus configured to identify, test, and/or initialize one or more information handling resources of an information handling system, typically during boot up or power on of an information handling system. A BIOS may include boot firmware configured to be the first code executed by a processor of an information handling system when then information handling system is booted and/or powered on. As part of its initialization functionality, BIOS code may be configured to set components of the information handling system into a known state, so that one or more applications (e.g., an operating system or other application programs) stored on compatible media may be executed by a processor and given control of the information handling system and its various components.

Oftentimes, various settings and parameters associated with a BIOS may be user-configurable, such that a user of an information handling system can configure or customize behavior of the BIOS and/or information handling resources of the information handling system. Because of its important role in the initialization of an information handling system, users often prefer to password protect the BIOS to prevent unauthorized access to the various settings and parameters associated with a BIOS. Similarly, other information handling resources of an information handling system (e.g., storage media such as a hard disk drive) may also be password-protected in order to provide security to prevent unauthorized access to the information handling system, its various components, and/or data stored thereon.

However, because a person may forget a password established for a BIOS or other information handling resource, a password unlock mechanism may exist in order to allow a user to gain access to the information handling resource when authentication credentials are forgotten.

Presently, one approach to unlocking a password for an information handling resource is based upon a master password that is generated from a unique identifier "challenge" associated with the information handling resource (e.g., a serial number or service tag number of the information handling resource or the information handling system in which the information handling resource is disposed). In such approach, a user may communicate the unique identifier to a vendor of the information handling resource (e.g., via telephone, e-mail, World Wide Web form submission, and/or other electronic method) along with information verifying the user's ownership of or authorization to use the information handling system and unlock the password (e.g., social security number, passphrase, birthdate, answer to challenge question, credit card number, or other personal data). Once user ownership or authorization is verified, the vendor may accept the unique identifier, apply a password-generation tool to the unique identifier to generate the master password for the information handling resource, and then communicate such master password to the user, who may input the master password in order to access the information handling resource.

The master password generation implementation may be based on an algorithm based on a shared secret shared between the information handling resource and the vendor's master password generation tool. Such algorithm may be used throughout many generations of information handling resources until it becomes compromised. Such implementation suffers from at least two disadvantages.

First, the input into the algorithm of the master password generation tool is always the same. For example, a particular information handling system with a particular unique identifier (e.g., service tag) will always have the same BIOS master password. Once a user has requested and received the master password from a vendor, that same master password will always unlock the specific information handling resource. This deficiency allows attackers to create lists of master passwords based on unique identifiers (e.g., "rainbow tables") in order to initiate attacks on information handling systems.

Second, the security of the master password hinges on the obscurity of the shared secret algorithm in the information handling resource. For example, because the BIOS exists on the motherboard and the algorithm must run at boot time to compute the master password for verification purposes, an attacker with access to an in-circuit emulator may snoop the processor and determine the algorithm. This deficiency allows a sufficiently skilled attacker to identify the algorithm and publish his or her findings publicly.

SUMMARY

In accordance with the teachings of the present disclosure, the disadvantages and problems associated with unlocking an information handling resource have been reduced or eliminated.

In accordance with embodiments of the present disclosure, an information handling system may include a processor, an information handling resource, and a one-time password tool associated with the information handling system. The one-time password tool may comprise a program of instructions embodied in computer-readable media, and may be configured to cause the processor to generate a random number, generate a challenge string based at least on the random number, and encrypt the challenge string using a first shared secret. The one time-password controller may also be configured to receive a one-time password generated by a vendor associated with the information handling resource, the one-time password generated by decrypting the challenge string using the first shared secret, parsing the random number from the decrypted challenge string, and digitally signing the decrypted challenge string with a digital signature using a second shared secret. The one-time password tool may also be configured to grant user access to the information handling resource in response to verifying, using the second shared secret, that the digital signature matches the random number.

In accordance with these and other embodiments of the present disclosure, a method may include generating a random number to be associated with an information handling resource. The method may also include generating a challenge string based at least on the random number. The method may additionally include encrypting the challenge string using a first shared secret. The method may further include receiving a one-time password generated by a vendor associated with the information handling resource, the one-time password generated by decrypting the challenge string using the first shared secret, parsing the random number from the decrypted challenge string, and digitally signing the decrypted challenge string with a digital signature using a second shared secret. The method may also include granting user access to the information handling resource in response to verifying, using the second shared secret, that the digital signature matches the random number.

In accordance with these and other embodiments of the present disclosure, an information handling system may include a processor and a one-time password tool associated with the information handling system. The one-time password tool may comprise a program of instructions embodied in computer-readable media, and configured to cause the processor to receive an encrypted challenge string associated with an information handling resource, the encrypted challenge string generated by a second information handling system in which the information handling resource is disposed, the encrypted challenge string generated by encrypting, using a first shared secret, a challenge string based at least on a random number generated by the second information handling system. The one-time password tool may also be configured to decrypt the encrypted challenge message using the first shared secret and parse the random number from the decrypted challenge string. The one-time password tool may further be configured to digitally sign the decrypted challenge string with a digital signature using a second shared secret to generate a one-time password, such that the one-time password may be used to grant access to the information handling resource by a user of the second information handling system in response to verifying, using the second shared secret, that the digital signature matches the random number.

In accordance with these and other embodiments of the present disclosure, a method may include receiving an encrypted challenge string associated with an information handling resource, the encrypted challenge string generated by a second information handling system in which the information handling resource is disposed, the encrypted challenge string generated by encrypting, using a first shared secret, a challenge string based at least on a random number generated by the second information handling system. The method may also include decrypting the encrypted challenge message using the first shared secret. The method may additionally include parsing the random number from the decrypted challenge string. The method may further include digitally signing the decrypted challenge string with a digital signature using a second shared secret to generate a one-time password, such that the one-time password may be used to grant access to the information handling resource by a user of the second information handling system in response to verifying, using the second shared secret, that the digital signature matches the random number.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
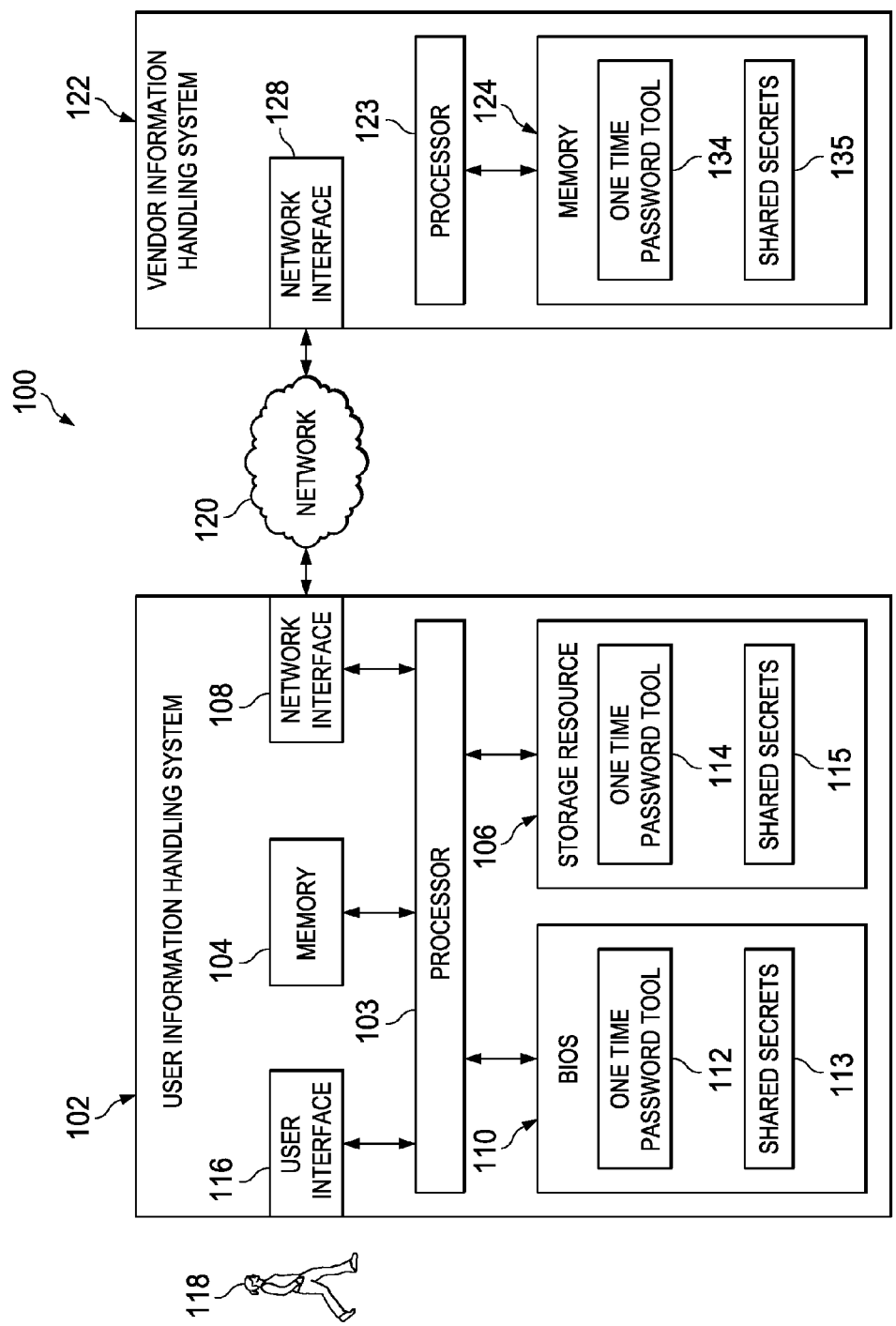
FIG. 1 illustrates a block diagram of an example system for generating a one-time password for an information handling resource, in accordance with certain embodiments of the present disclosure.
Figure 2:
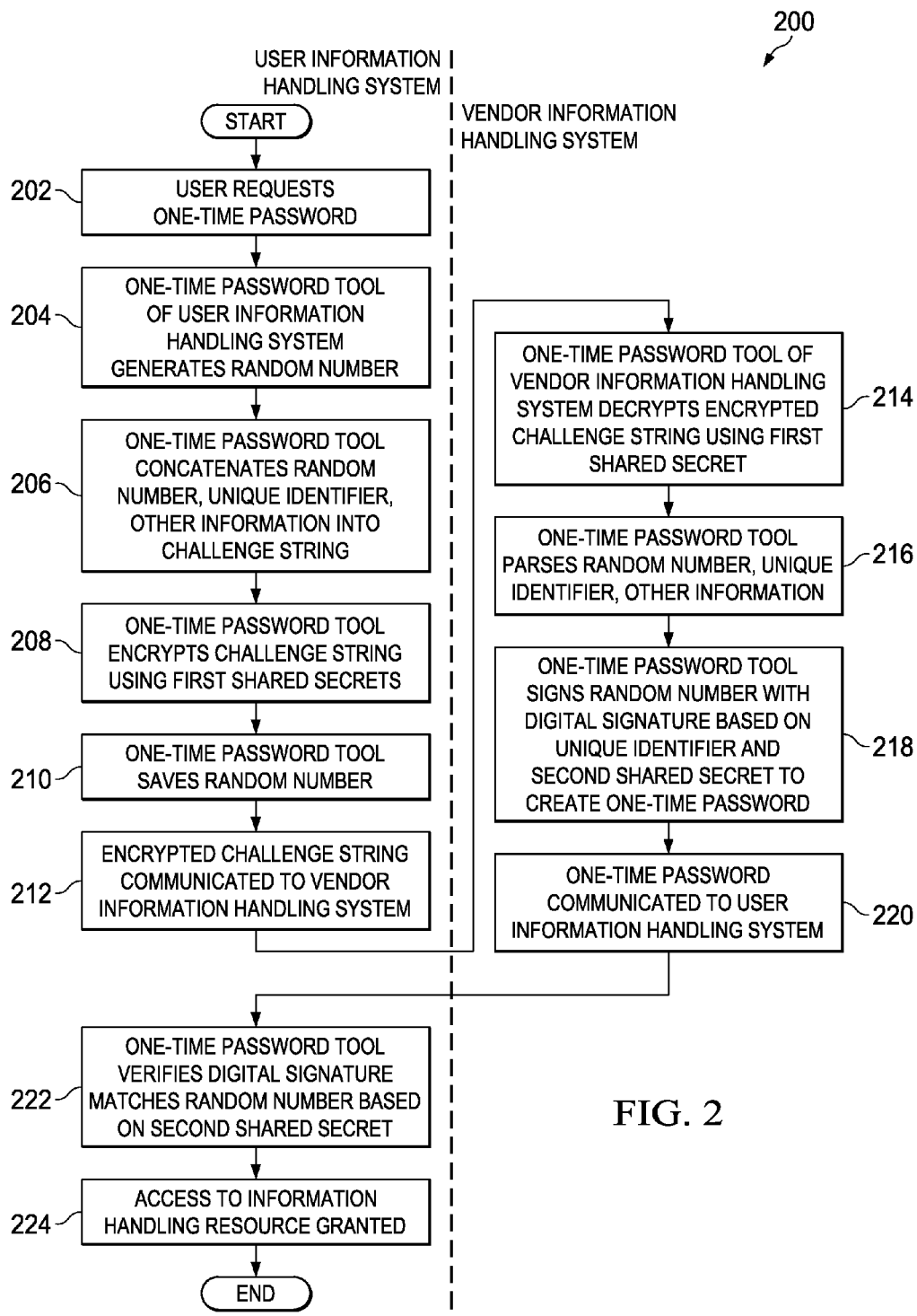
FIG. 2 illustrates a flow chart of an example method for generating a one-time password for an information handling resource, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, BIOSs, busses, memories, I/O devices and/or interfaces, storage resources, network interfaces, motherboards, and/or any other components and/or elements of an information handling system.

FIG. 1 illustrates a block diagram of an example system 100 for generating a one-time password for an information handling resource, in accordance with certain embodiments of the present disclosure. As shown in FIG. 1, system 100 may include a user information handling system 102 and a vendor information handling system 122. In some embodiments, user information handling system 102 and vendor information handling system 122 may be communicatively coupled via a network 120.

In some embodiments, user information handling system 102 may be a server. In others embodiment, user information handling system 102 may be a personal computer (e.g., a desktop computer or a portable computer). As depicted in FIG. 1, user information handling system 102 may include a processor 103, a memory 104 communicatively coupled to processor 103, a storage resource 106 communicatively coupled to processor 103, a network interface 108 communicatively coupled to processor 103, BIOS 110 communicatively coupled to processor 103, and a user interface 116 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, BIOS 110 and/or another component of user information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to user information handling system 102 is turned off.

Storage resource 106 may be communicatively coupled to processor 103 and may include any system, device, or apparatus configured to retain program instructions or data for a period of time (e.g., a computer-readable medium). In some embodiments, storage resource 106 may include a hard disk drive, a magnetic tape library, an optical disk drive, a magneto-optical disk drive, a compact disc drive, a solid state storage drive, a FLASH drive and/or any other suitable computer-readable medium.

In some embodiments, storage resource 106 may be password protected such that a user of user information handling system 102 must enter a password prior to accessing applications and/or data stored on storage resource 106. For example, firmware associated with storage resource 106 may execute (e.g., on processor 103) upon boot and/or powering-on of user information handling system 102 to request a password (e.g., via user interface 116) prior to processor 103 accessing any applications and/or data of storage resource 106. In embodiments in which storage resource 106 is password protected, storage resource 106 may comprise one-time password tool 114 and shared secrets 115.

One-time password tool 114 may include any system, device, or apparatus configured to, in concert with a one-time password tool 134 of vendor information handling system 122, facilitate the generation and receipt of a one-time password for accessing storage resource 106 (e.g., to provide access when a user password for storage resource 106 is lost or forgotten), as is described in greater detail elsewhere in this disclosure. In some embodiments, one-time password tool 114 may be implemented as a program of instructions that may be read by and executed on processor 103 to carry out the functionality of one-time password tool 114.

Shared secrets 115 may comprise one or more random numbers, symmetric keys, asymmetric private/private key pairs, and/or other suitable secrets that may be used by one-time password tool 114 to facilitate the generation and receipt of a one-time password for accessing storage resource 106, as is described in greater detail elsewhere in this disclosure.

Network interface 108 may comprise any suitable system, apparatus, or device operable to serve as an interface between user information handling system 102 and network 120. Network interface 108 may enable user information handling system 102 to communicate over network 120 using any suitable transmission protocol and/or standard, including without limitation all transmission protocols and/or standards enumerated below with respect to the discussion of network 120. In certain embodiments, network interface 108 may comprise a network interface card, or "NIC."

BIOS 110 may be communicatively coupled to processor 103 and may include any system, device, or apparatus configured to identify, test, and/or initialize information handling resources of user information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when user information handling system 102 is booted and/or powered on. As part of its initialization functionality, BIOS code may be configured to set components of user information handling system 102 into a known state, so that one or more applications (e.g., an operating system or other application programs) stored on compatible media (e.g., memory 104) may be executed by processor 103 and given control of user information handling system 102.

In some embodiments, BIOS 110 may be password protected such that a user of user information handling system 102 must enter a password prior to accessing user-configurable settings and/or parameters of BIOS 110. For example, a portion of BIOS 110 may execute (e.g., on processor 103) when a user gives an indication (e.g., pressing of a "hot key") of a desire to configure BIOS 110 settings and/or parameters of user information handling system 102, and such portion of BIOS 110 may request (e.g., via user interface 116) a password prior to processor 103 accessing any additional portions. In embodiments in which storage resource 106 is password protected, storage resource 106 may comprise one-time password tool 112 and shared secrets 113.

One-time password tool 112 may include any system, device, or apparatus configured to, in concert with a one-time password tool 134 of vendor information handling system 122, facilitate the generation and receipt of a one-time password for accessing user-configurable settings and/or parameters of BIOS 110 (e.g., to provide access when a user password for BIOS 110 is lost or forgotten), as is described in greater detail elsewhere in this disclosure. In some embodiments, one-time password tool 112 may be implemented as a program of instructions that may be read by and executed on processor 103 to carry out the functionality of one-time password tool 112.

Shared secrets 113 may comprise one or more random numbers, symmetric keys, asymmetric private/private key pairs, and/or other suitable secrets that may be used by one-time password tool 112 to facilitate the generation and receipt of a one-time password for accessing BIOS 110, as is described in greater detail elsewhere in this disclosure.

User interface 116 may comprise any instrumentality or aggregation of instrumentalities by which a user 118 may interact with user information handling system 102. For example, user interface 116 may permit user 118 to input data and/or instructions into user information handling system 102 (e.g., via a keyboard, pointing device, and/or other suitable component), and/or otherwise manipulate user information handling system 102 and its associated components. User interface 116 may also permit user information handling system 102 to communicate data to user 118, e.g., by way of a display device.

Network 120 may be a network and/or fabric configured to couple user information handling system 102 and vendor information handling system 122 to each other and/or one or more other information handling systems. In some embodiments, network 120 may include a communication infrastructure, which provides physical connections, and a management layer, which organizes the physical connections and information handling systems communicatively coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

In some embodiments, vendor information handling system 122 may be a server. In other embodiments, vendor information handling system 122 may be a personal computer (e.g., a desktop computer or a portable computer). As depicted in FIG. 1, vendor information handling system 122 may include a processor 123, a memory 124 communicatively coupled to processor 123, and a network interface 128 communicatively coupled to processor 123.

Processor 123 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 123 may interpret and/or execute program instructions and/or process data stored in memory 124 and/or another component of user information handling system 122.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to vendor information handling system 122 is turned off.

As shown in FIG. 1, memory 124 may have stored thereon one-time password tool 134 and shared secrets 115. One-time password tool 134 may include any system, device, or apparatus configured to, in concert with one-time password tool 112 and/or one-time password tool 114 of user information handling system 102, facilitate the generation of a one-time password for accessing user-configurable settings and/or parameters of BIOS 110 (e.g., to provide access when a user password for BIOS 110 is lost or forgotten) or accessing storage resource 106 (e.g., to provide access when a user password for storage resource 106 is lost or forgotten) as is described in greater detail elsewhere in this disclosure. In some embodiments, one-time password tool 134 may be implemented as a program of instructions that may be read by and executed on processor 123 to carry out the functionality of one-time password tool 134.

Shared secrets 135 may comprise one or more random numbers, symmetric keys, asymmetric private/private key pairs, and/or other suitable secrets that may be used by one-time password tool 134 to facilitate the generation and receipt of a one-time password for accessing BIOS 110, storage resource 106, and/or another information handling resource of information handling system 102, as is described in greater detail elsewhere in this disclosure. A shared secret 135 may correspond to an associated shared secret 113 or shared secret 115 of user information handling system 102. For example, where shared secret 135 is a first key of a key pair, shared secret 113 or shared secret 115 may be the second key of a key pair.

Although element 122 of FIG. 1 is referred to as a "vendor information handling system," it is noted that the term "vendor" as used herein is intended to encompass any entity in the supply chain of a relevant information handling resource of information handling system 102, whether such entity includes a seller, manufacturer, wholesaler, factory, and/or other provider of the relevant information handling resource.

FIG. 2 illustrates a flow chart of an example method 200 for generating a one-time password for an information handling resource, in accordance with certain embodiments of the present disclosure. According to one embodiment, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, a user (e.g., user 118) may make a request for a one-time password. Such request may be made via a user interface (e.g., user interface 116), for example, at a password-entry screen presented by a BIOS or other program of instructions associated with an information handling resource.

At step 204, a one-time password tool (e.g., one-time password tool 112 or one-time password tool 114) of a user information handling system (e.g., user information handling system 102) may generate a random number. Such random number may be generated by any suitable manner known in the art.

At step 206, the one-time password tool may concatenate the random number, a unique identifier associated with the information handling resource (e.g., service tag, serial number, etc.), and/or other information (e.g., key revision number) into a challenge string.

At step 208, the one-time password tool may encrypt the challenge string using a first shared secret (e.g., a shared secret 113 or shared secret 115). In some embodiments, the one-time password tool may encrypt the challenge string with a public key of a first public/private key pair.

At step 210, the one-time password tool may save the random number to a computer-readable medium associated with the information handling resource.

At step 212, the encrypted challenge string may be communicated to a vendor information handling system (e.g., vendor information handling system 122). In some embodiments, the encrypted challenge string may be communicated via a network (e.g., the Internet). In other embodiments, the encrypted challenge string may be communicated by a user of the user information handling system (e.g., via telephone) to a technician who may enter the encrypted challenge string into the one-time password tool of the vendor information handling system.

At step 214, a one-time password tool (e.g., one-time password tool 134) of the vendor information handling system may decrypt the encrypted challenge string using the first shared secret (e.g., shared secret 135) used to encrypt the challenge string at step 208. In embodiments in which the challenge string is encrypted at the user information handling system using a public key of a first public/private key pair, the one-time password tool of the vendor information handling system may decrypt the challenge string using the corresponding private key of the first public/private key pair.

At step 216, the one-time password tool may parse the random number, the unique identifier (e.g., a service tag or serial number), and/or other information (e.g., key revision).

At step 218, the one-time password tool may sign the random number with a digital signature based on the unique identifier and/or the other information in order to create a one-time password. The one-time password tool may use a second shared secret to create the digital signature. In some embodiments, the second shared secret may comprise a private key of a second public/private key pair.

At step 220, the one-time password may be communicated to the user information handling system. In some embodiments the one-time password may be communicated via a network (e.g., the Internet). In other embodiments, the encrypted challenge string may be communicated by a technician (e.g., via telephone) to the user information handling system who may enter the one-time password into the one-time password tool of the user information handling system.

At step 222, the one-time password tool may verify the digital signature matches the random number based on the second shared secret. For example, the one-time password tool may perform the digital signature verification using the random number as the message, the one-time password as the message signature, and the second shared secret as the key. In embodiments in which the digital signature is created using a private key of the second public/private key pair, digital signature verification may be performed using the corresponding public key of the second public/private key pair. In these and other embodiments, the public key may be associated with a particular key revision value.

At step 224, in response to digital signature verification, access to the information handling resource may be granted. In some embodiments, the one-time password tool associated with the information handling resource may query the user for a new password to be used for future accesses.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
   a processor;
   an information handling resource; and
   a one-time password tool associated with the information handling system, the one-time password tool comprising a program of instructions embodied in non-transitory computer readable media, and configured to cause the processor to:
   generate a random number;
   generate a challenge string based at least on the random number;
   encrypt the challenge string using a first shared secret;
   receive a one-time password generated by a vendor associated with the information handling resource, the one-time password generated by decrypting the challenge string using the first shared secret, parsing the random number from the decrypted challenge string, and digitally signing the decrypted challenge string with a digital signature using a second shared secret; and
   grant user access to the information handling resource in response to verifying, using the second shared secret, that the digital signature matches the random number.

2. The information handling system of claim 1, wherein:
   the challenge string is further based at least on additional information including at least
   one of a unique identifier and a key revision value;
   the additional information is further parsed from the decrypted challenge string; and
   the digital signature is based on the additional information.

3. The information handling system of claim 1, wherein at least one of the first shared secret and the second shared secret is a public/private key pair.

4. The information handling system of claim 1, wherein the challenge string is encrypted using a public key of a public/private key pair and the challenge string is decrypted using a private key of the public/private key pair.

5. The information handling system of claim 1, wherein the digital signature is created using a private key of a public/private key pair and the digital signature is verified using a public key of the public/private key pair.

6. The information handling system of claim 1, wherein the information handling resource comprises one of a basic input/output system and a storage resource.

7. A computer-implemented method comprising: generating a random number to be associated with an information handling resource;
   generating a challenge string based at least on the random number;
   encrypting the challenge string using a first shared secret;
   receiving a one-time password generated by a vendor associated with the information handling resource, the one-time password generated by decrypting the challenge string using the first shared secret, parsing the random number from the decrypted challenge string, and digitally signing the decrypted challenge string with a digital signature using a second shared secret; and
   granting user access to the information handling resource in response to verifying, using the second shared secret, that the digital signature matches the random number.

8. The method of claim 7, wherein:
   the challenge string is further based at least on additional information including at least one of a unique identifier and a key revision value;
   the additional information is further parsed from the decrypted challenge string; and
   the digital signature is based on the additional information.

9. The method of claim 7, wherein at least one of the first shared secret and the second shared secret is a public/private key pair.

10. The method of claim 7, wherein the challenge string is encrypted using a public key of a public/private key pair and the challenge string is decrypted using a private key of the public/private key pair.

11. The method of claim 7, wherein the digital signature is created using a private key of a public/private key pair and the digital signature is verified using a public key of the public/private key pair.

12. The method of claim 7, wherein the information handling resource comprises one of a basic input/output system and a storage resource.

13. An information handling system comprising:
   a processor;
   a one-time password tool associated with the information handling system, the one-time password tool comprising a program of instructions embodied in non-transitory computer readable media, and configured to cause the processor to:
   receive an encrypted challenge string associated with an information handling resource, the encrypted challenge string generated by a second information handling system in which the information handling resource is disposed, the encrypted challenge string generated by encrypting, using a first shared secret, a challenge string based at least on a random number generated by the second information handling system;
   decrypt the encrypted challenge message using the first shared secret;
   parse the random number from the decrypted challenge string; and
   digitally sign the decrypted challenge string with a digital signature using a second shared secret to generate a one-time password, such that the one-time password is used to grant access to the information handling resource by a user of the second information handling system in response to verifying, using the second shared secret, that the digital signature matches the random number.

14. The information handling system of claim 13, wherein:
   the challenge string is further based at least on additional information including at least one of a unique identifier and a key revision value;
   the additional information is further parsed from the decrypted challenge string; and
   the digital signature is based on the additional information.

15. The information handling system of claim 13, wherein at least one of the first shared and the second shared secret is a public/private key pair.

16. The information handling system of claim 13, wherein the challenge string is encrypted using a public key of a public/private key pair and the challenge string is decrypted using a private key of the public/private key pair.

17. The information handling system of claim 13, wherein the digital signature is created using a private key of a public/private key pair and the digital signature is verified using a public key of the public/private key pair.

18. The information handling system of claim 13, wherein the information handling resource comprises one of a basic input/output system and a storage resource.

19. A method comprising:
   receiving an encrypted challenge string associated with an information handling resource, the encrypted challenge string generated by a second information handling system in which the information handling resource is disposed, the encrypted challenge string generated by encrypting, using a first shared secret, a challenge string based at least on a random number generated by the second information handling system;
   decrypting the encrypted challenge message using the first shared secret;
   parsing the random number from the decrypted challenge string; and
   digitally signing the decrypted challenge string with a digital signature using a second shared secret to generate a one-time password, such that the one-time password is used to grant access to the information handling resource by a user of the second information handling system in response to verifying, using the second shared secret, that the digital signature matches the random number.

20. The method of claim 19, wherein at least one of the first shared secret and the second shared secret is a public/private key pair.

* * * * *